United States Patent

Kaneko et al.

[11] Patent Number: 5,297,530
[45] Date of Patent: Mar. 29, 1994

[54] HEATING DEVICE FOR INJECTED FUEL FOR INTERNAL COMBUSTION ENGINE

[75] Inventors: Noboru Kaneko, Kamakura; Takahisa Yamashita, Suntoh, both of Japan

[73] Assignees: Nissan Motor Co., Ltd., Yokohama; Texas Instruments Japan Limited, Tokyo, both of Japan

[21] Appl. No.: 943,827

[22] Filed: Sep. 11, 1992

[30] Foreign Application Priority Data

Sep. 12, 1991 [JP] Japan .................. 3-232135

[51] Int. Cl.$^5$ .......................................... F02M 31/00
[52] U.S. Cl. ....................................... 123/549; 123/557
[58] Field of Search ............... 123/549, 557, 552, 547

[56] References Cited

U.S. PATENT DOCUMENTS

| | | | |
|---|---|---|---|
| 4,345,569 | 8/1982 | Hattori et al. | 123/549 |
| 4,387,291 | 6/1983 | Keppel | 123/549 |
| 4,395,993 | 8/1983 | Tanaka et al. | 123/549 |
| 4,395,994 | 8/1983 | Goto et al. | 123/549 |
| 4,419,564 | 12/1983 | Marcoux | 123/549 |
| 5,056,495 | 10/1991 | Yamashita et al. | 123/549 |
| 5,115,787 | 5/1992 | von Pickartz | 123/549 |
| 5,119,794 | 6/1992 | Kushida et al. | 123/549 |
| 5,179,927 | 1/1993 | Henke et al. | 123/549 |

FOREIGN PATENT DOCUMENTS 56-6056 1/1981 Japan .

*Primary Examiner*—Tony M. Argenbright
*Assistant Examiner*—M. Macy
*Attorney, Agent, or Firm*—Foley & Lardner

[57] ABSTRACT

A heating device for injected fuel in an internal combustion engine is disposed at an upper wall of an intake port. The heating device includes a casing and a plurality of fins integrally connected to a lower plate of the casing. A heater is disposed between the intake port and the casing. The fins are arranged to downwardly extend from said supporting member and along the injected direction of the injected fuel. Therefore, the atomization of the injected fuel is accelerated by the heating of the heating device.

12 Claims, 6 Drawing Sheets

HEATING DEVICE FOR INJECTED FUEL FOR INTERNAL COMBUSTION ENGINE

BACKGROUND OF THE INVENTION

1. Field of the Invention

The present invention relates to improvements in a heating device for fuel injected from a fuel injection valve of an electronic control type in an internal combustion engine.

2. Description of the Prior Art

It is well known that electronic fuel injection systems are now used in internal combustion engines for automotive vehicles in order to improve the responsive and emissive performance of the engine by precisely adjusting air-fuel ratio. Furthermore, some of such engines are provided with heating devices for heating fuel injected from fuel injection valves in order to promote vaporization of fuel. Such a heating device is disclosed, for example, in Japanese Patent Provisional Publication No. 56-6056. The heating device is provided with a cylindrical body and a PTC (Positive Temperature Coefficient) heater. The cylindrical body is made of aluminum alloy and fixed to an inner surface of an intake port of an internal combustion engine. The PTC heater is embedded in the cylindrical body and connected to a battery which provides current. The cylindrical body is disposed downstream of a fuel injection valve such that fuel injected from the fuel injection valve passes through the cylindrical body. Accordingly, at a start time of the engine, the injected fuel is heated by the heating device in order to accelerate the vaporization of the injected fuel.

However, with the above-mentioned heating device, since only an inner surface of the cylindrical body contributes to the heating of the injected fuel, it is not sufficient to heat the injected fuel effectively. That is, the cylindrical body can not sufficiently heat up the injected fuel passing through the central part of therein.

SUMMARY OF THE INVENTION

It is an object of the present invention to provide an improved heating device which is free of the above mentioned drawbacks.

A heating device according to the present invention is disposed in an intake passage of an internal combustion engine. The heating device heats fuel injected from a fuel injection valve into the intake passage. The heating device comprises a supporting member which is fixed to a wall defining the intake passage. A plurality of fins is arranged to extend from the supporting member and along the injected direction of the fuel.

With this arrangement, fuel injected from the fuel injection valve passes through spaces between the fins having a relative large heat transmitting surface, and effectively heated. Accordingly, this permits the down sizing and the electric power consumption of this heating device.

BRIEF DESCRIPTION OF THE DRAWINGS

In the drawings, like reference numerals designate like parts and elements throughout all figures, in which.

DETAILED DESCRIPTION OF THE INVENTION

Referring now to FIGS. 1 to 4, there is shown a first embodiment of a heating device 11 for injected fuel in an internal combustion engine according to the present invention.

Figure 1:
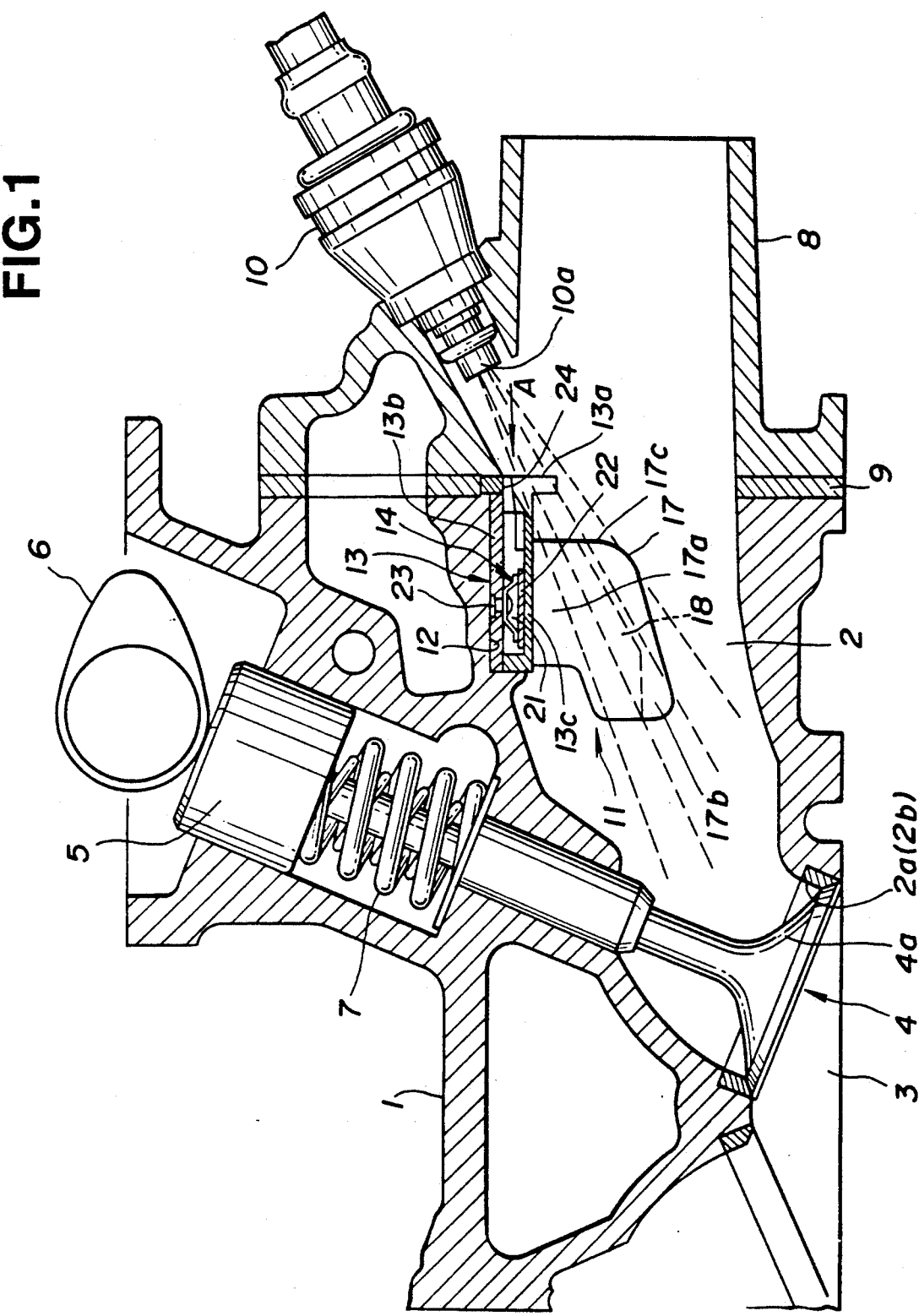
FIG. 1 is an enlarged cross sectional view of an essential part of an internal combustion engine to which a first embodiment of a heater device according to the present invention is applied.

The heating device 11 is applied to a DOHC type internal combustion engine. As shown in FIG. 1, a cylinder head 1 is provided with a plurality of intake ports 2 which are connected to an intake manifold 8 through a gasket 9. Each intake port 2 is communicated with each combustion chamber 3 located under the cylinder head 1. A pair of intake valves 4 are arranged to close and open a pair of open ends 2a of the cylinder head 1, respectively. The intake valve 4 is operated by a cam 6 and a valve spring 7 through a hydraulic valve lifter 5 of a direct drive type. Intake air for the engine is filtered by an air cleaner (not shown) and supplied to the intake ports 2 through the intake manifold 8. Each fuel injection valve 10 corresponding to each combustion chamber 3 is disposed at a downstream end portion of the intake manifold 8. The fuel injection valve 10 is arranged such that its injection hole 10a points to a center portion of a pair of valve heads 4a of the intake valves 4.

The heating device 11 is disposed at an upper wall portion of the intake port 2 close to the gasket 9, as shown in FIG. 1. The heating device 11 comprises a casing 13 received in a rectangular shaped supporting groove portion 12 which is formed at the upper wall portion of the intake port 2. A heater 14 is installed in the supporting groove portion 12 and covered with the casing 13. The casing 13 made of aluminum is formed in a box-shape and integrally connected to a plurality of fins 15, 16, 17, 18 and 19. The casing 13 is provided with a rectangular shaped end plate 13a which is fixed to the cylinder head 1 by being screwed by bolts (no numeral) through holes 20 formed in the end plate 13a. The heater 14 is of a wide area heating type and includes a PTC ceramic element which is made from barium titanate and the like and functions as a heating element. The PTC element 21 is connected to its upper surface to the heat exchanger plate 22 connected to negative electrode with electrically conductive adhesive and the like. A lower surface of the PTC element 21 is connected with rivets 23 to an electric source end terminal plate 13b of the casing 13 which plate is electrically connected to a positive electrode of an electric source (a car battery).

When the current is supplied to the circuitry from the electric source, the PTC element 21 is arranged to be momentarily raised to temperatures ranging from 140° to 150° C. Since the PTC element 21 has an electrical property of the positive temperature coefficient, that is according to the raising of the temperature of the PTC element, its electric resistance is increased, the temperature of the PTC element 21 is prevented from being further raised over a predetermined temperature. This functions to limit the current and therefore the PTC element 21 is controlled at a predetermined temperature.

Figure 2:
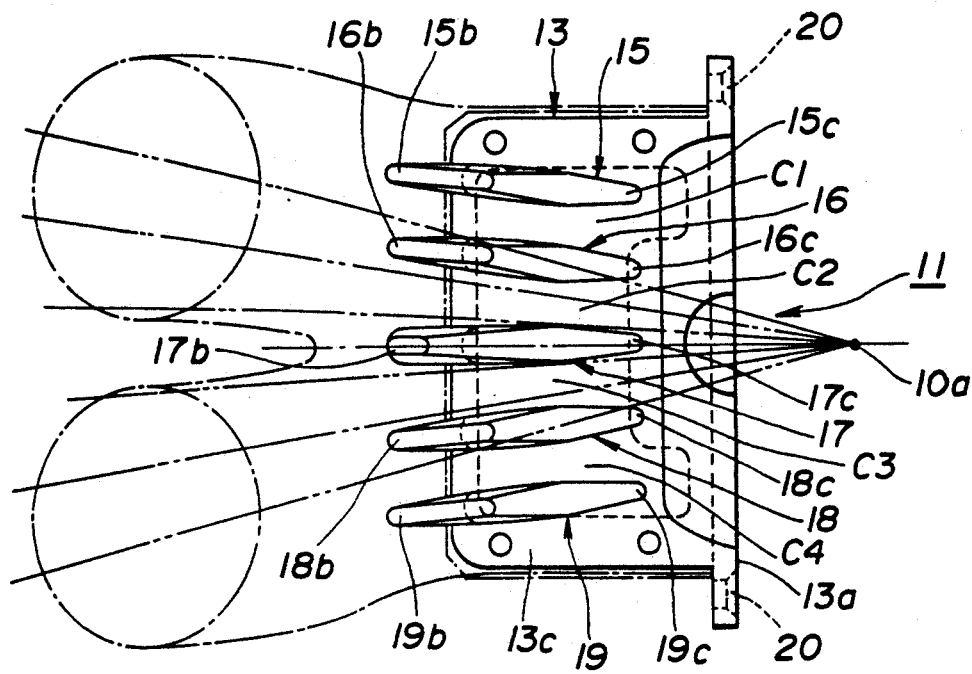
FIG. 2 is a bottom view of the first embodiment of the heater device according to the present invention.
Figure 3:
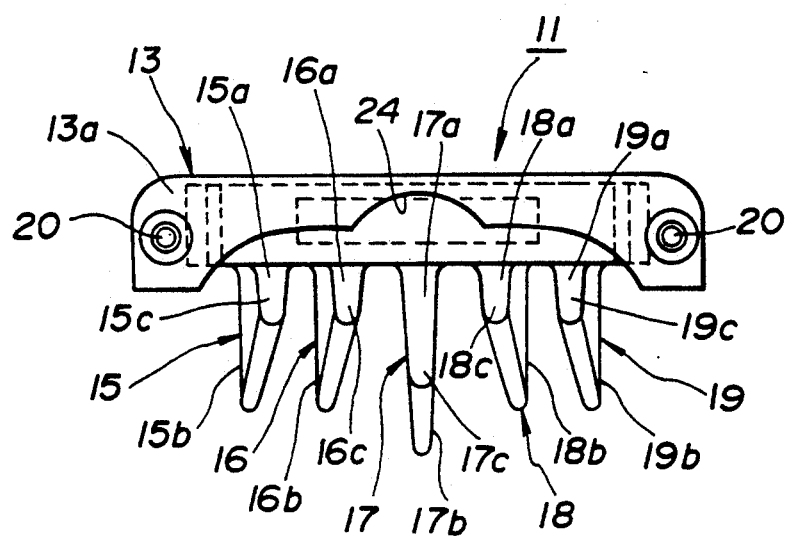
FIG. 3 is a side view taken in the direction of the arrow A of FIG. 1.

The fins 15, 16, 17, 18 and 19 are made from five aluminum plates formed generally L-shaped, and arranged to have spaces C1, C2, C3 and C4 between surfaces of adjacent plates 15, 16, 17, 18 and 19, as shown in FIGS. 2 and 3. The fins 15 to 19 are integrally connected to the lower plate 13c of the casing 13 and disposed side by side while being generally along the injected direction (indicated by two-dot chain line in FIG. 2) of fuel injected from the fuel injection valve 10.

More specifically, each fin 15 (16, 17, 18, 19) comprises each base end portion 15a (16a, 17a, 18a, 19a) connected to the lower plate 13c and each extended portion 15b (16b, 17b, 18b, 19b) extending from the base end portion 15a (16a, 17a, 18a, 19a) toward the intake valve 4. The fin 17 located at a central portion is formed to have the largest base end portion 17a and extended portion 17b in the fins 15 to 19. Each front surface 15c (16c, 17c, 18c, 19c) of the base end portion 15a (16a, 17a, 18a, 19a) is located to be opposite to the injection valve 10 through a cut-away portion 24 of the end plate 13a. The center fin 17 is aligned on a hypothetical line connecting the injection hole 10a and the center point between the two intake valves 4, 4. The other fins 15, 16, 18 and 19, both sides of the center fin 17, are arranged to be along with the injected direction (two-dot chain line in FIG. 2) of the fuel. The outer peripheries of the fins 15 to 19 are formed arcuate so as to suppress the flow resistance of the intake air and injected fuel. The extended portion 15b (16b, 17b, 18b, 19b) is formed to be thinner than the base end portion 15a (16a, 17a, 18a, 19a) so as to smoothly rectify the flow of the intake air and injected fuel. The center fin 17 is formed to have substantially the same area as the vertical cross sectional area of the injected fuel passing through the outer surface of the center fin 17, as shown in FIG. 1. Furthermore, the other fins 15, 16, 18 and 19 are formed to have substantially the same areas as the vertical cross sectional area of the injected fuel passing through the outer surfaces of the fins 15, 16, 18 and 19, respectively.

With the thus arranged heating device, the PTC element 21 is raised to high temperature in a manner to turn on electricity from the battery when the engine is started by turning on the ignition switch during a cold condition. Accordingly, the fins 15 to 19 are rapidly raised to a predetermined temperature in a manner that the heat generated by the PTC element 21 is transmitted through the lower plate 13c to the fins 15 to 19.

The mixture of the intake air and the injected fuel is flowed toward the valve heads 4a, 4a of the intake valves 4, 4 through the spaces C1 to C4 of fins 15 to 19. Accordingly, the mixture is heated by the heat radiated from the peripheral surfaces of the fins 15 to 19, when the mixture passes through the spaces C1 to C4, and therefore the fuel is effectively heated and the vaporization can be promoted.

Since each surface area of the fins 15 to 19 are formed such that their cross sectional areas along the fuel injected direction is substantially same as the cross sectional area of the injected fuel passing through the outer surface of the fins 15 to 19, and the spaces C1 to C4 are formed narrow, the total area of the outer surface of the fins 15 to 19 is substantially enlarged. This enables the injected fuel to be rapidly and effectively heated. Furthermore, since the injected fuel dividedly passes through the spaces C1 to C4, the injected fuel is further accelerated to be vaporized without being unevenly distributed. This enables the heating device 11 to be made small in size and suppresses the electric current amount supplied to the PTC element 21 of the heater 14.

Figure 4:
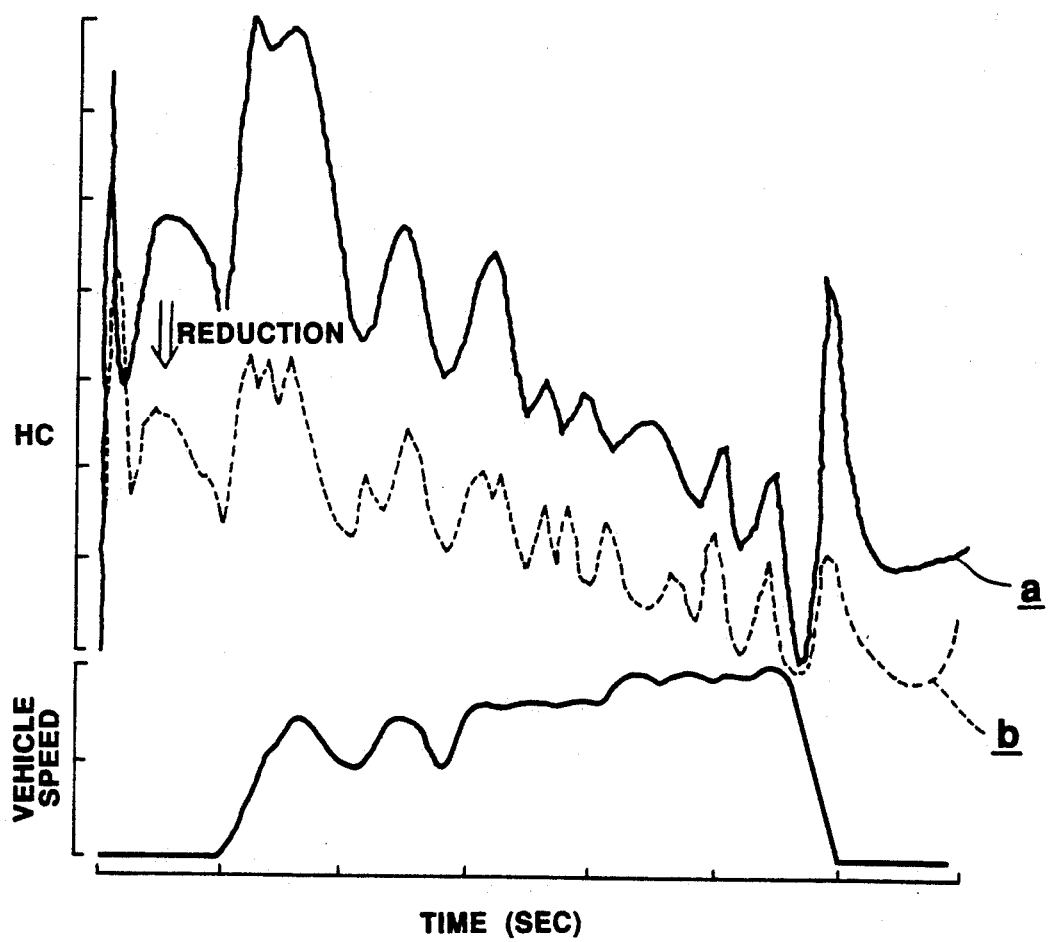
FIG. 4 is a graph showing the reduction effect of HC by utilizing the heater device according to the present invention.

Since the fins 15 to 19 are installed to the upper wall portion of the intake port 2, the fuel attached to the fins 15 to 19 is almost vaporized by heating. The other attached fuel is flowed to each downstream end of each extended portion 15b (16b, 17b, 18b, 19b) and atomized at the downstream end by the intake air flow. Accordingly, the injected fuel is prevented from being liquidated and dropped into the combustion chamber 3 although such a problem has been caused in a conventional heating device such as a heater located at a lower wall portion of the intake port or cylindrical shaped heater. This improves the combustion condition of the engine and provides a stable engine speed in an idling time from a start to the end of the warming-up of the engine. Furthermore, the emission of the engine is also improved. That is to say, the emission from the engine is improved as shown in FIG. 4 wherein a continuous line a represents an emission property (HC density) of a conventional system and a dotted line b represents an emission property (HC density) of the system provided with the heating device 11 according to the present invention.

Since the heat capacity of the fins 15 to 19 is considerably smaller than the conventional cylindrical shaped device, the fins 15 to 19 are raised to the predetermined temperature in a short time and accelerated vaporization of fuel is realized just after start up.

Furthermore, since the fins 15 to 19 are arranged to be along the injected direction of the fuel, the mixture is rectified and rapidly supplied to the combustion chamber 3. This prevents the degradation of the charging efficiency, the power output and the fuel consumption of the engine.

When the temperature of the intake port 2 is raised to the range from 70° to 80° C., the PTC element 21 is turned off and the fins 15 to 19 are heated by a heat from the cylinder head 1. Accordingly, the temperature of a fuel heating member is lowered and therefore the degradation of the charging efficiency of intake air is prevented.

Figure 5:
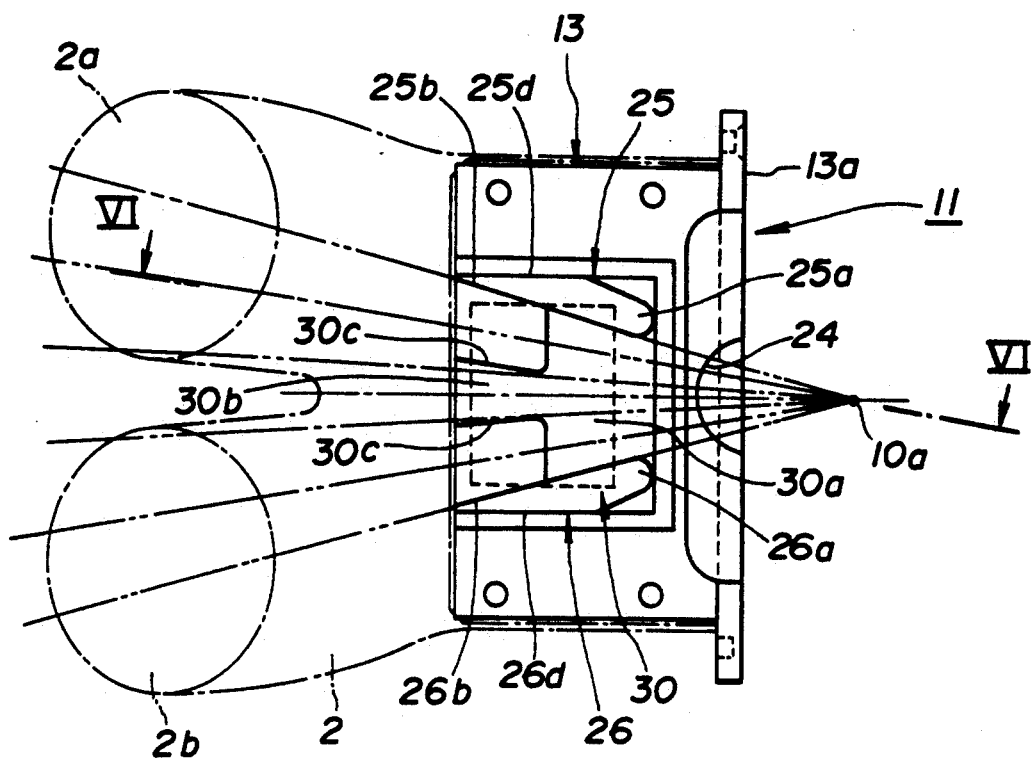
FIG. 5 is a bottom view of a second embodiment of the heater device according to the present invention.
Figure 6:
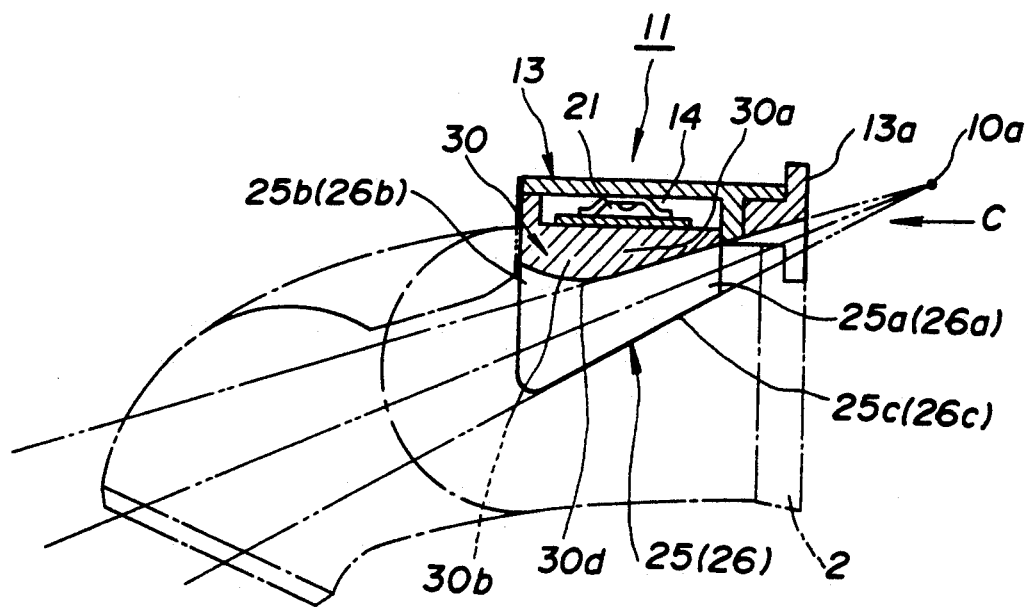
FIG. 6 is a side view taken in the direction of arrows substantially along the line VI—VI of FIG. 5.
Figure 7:
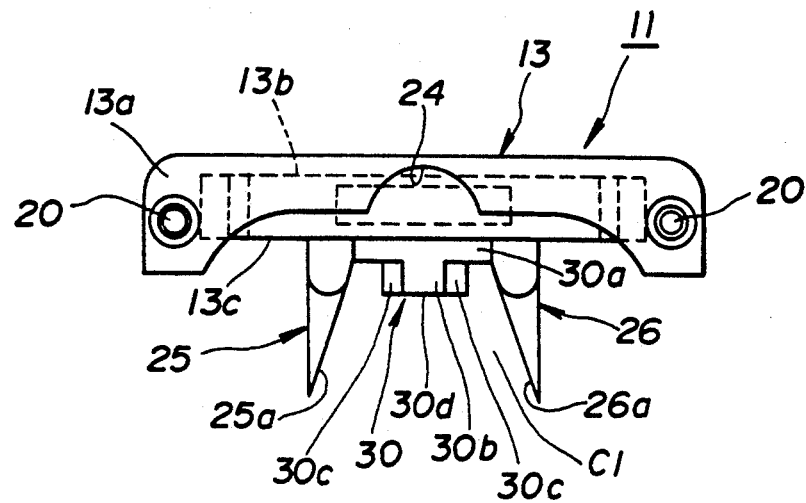
FIG. 7 is a side view taken in the direction of arrow C of FIG. 6.

Referring to FIGS. 5 to 7, there is shown a second embodiment of the heating device 11 for injected fuel according to the present invention.

In the second embodiment, the heating device 11 comprises a pair of fins 25 and 26 and a guide portion 30. Each fin 25, 26 is arranged to be along the injected direction of the fuel injected from the fuel injection hole 10a toward each intake port 2. The casing 13 and the heater 14 are generally similar to that of the first embodiment. The guide portion 30 is downwardly projected from the lower plate 13c of the casing 13.

The guide portion 30 is provided with a T-shaped base part 30a fixed to the lower plate 13c and a projecting part 30b which is integral with the base part 30a and extends toward the axis of the intake port 2. A front portion of the base part 30a is laterally elongated between fins 25 and 26 and positioned to be opposite to the fuel injection valve 10. The projecting part 30b is formed trapezoid and has a pair of side surfaces 30c, 30c which are gradually sprinted along the injected direction of the fuel. Furthermore, a lower surface 30d of the guide portion 30 is formed arcuate so as to smoothly guide intake air to the combustion chamber 3.

The fins 25 and 26 are formed generally triangular as shown in FIG. 6 and arranged so as to be aligned with the lines defining the angle of the injected fuel which is shown by a two-dot chain line as shown in FIG. 5. Accordingly, a space C1 of a triangle shape is defined between the fins 25 and 26 and on the guide portion 30. The fins 25 and 26 are formed to gradually enlarge their vertical lengths from the front ends 25a and 26a to the rear ends 25b and 26b, as shown in FIG. 6. The front ends 25a and 26a are disposed to be opposite to the injection hole 10a through the cut-away 24 of an arcuate shape. Lower side parts 25c and 26c of the fins 25 and 26 are formed to be gradually thinned from the front ends 25a and 26a toward the rear ends 25b and 26b. The fins 25 and 26 are sharpened at their rear ends 25b and 26b and arranged to be along the injected direction of the injected fuel. Outer surfaces 25d and 26d of the fins 25 and 26 are formed to be parallel with the side surfaces of the casing 13 in order to avoid the interference with the casing 13.

With the thus arranged heating device, when the injected fuel (two-dot chain line) passes through the space C1, the injected fuel is effectively heated by the inner surfaces of the fins 25 and 26 and the guide portion 30.

Since the injected fuel is rectified and guided to the generally center portion of the valve heads 4a, 4a by each inner surfaces of the fins 25 and 26 and the guide portion 30, the fuel is effectively supplied into the combustion chamber 3 and is stably burned.

Furthermore, the fuel attached on the surfaces of the fins 25 and 26 is flowed along the lower side parts 25c and 26c, and stably released at the tip rear ends 25b and 26b. Accordingly, the fuel is sufficiently atomized and effectively burned.

Figure 8:
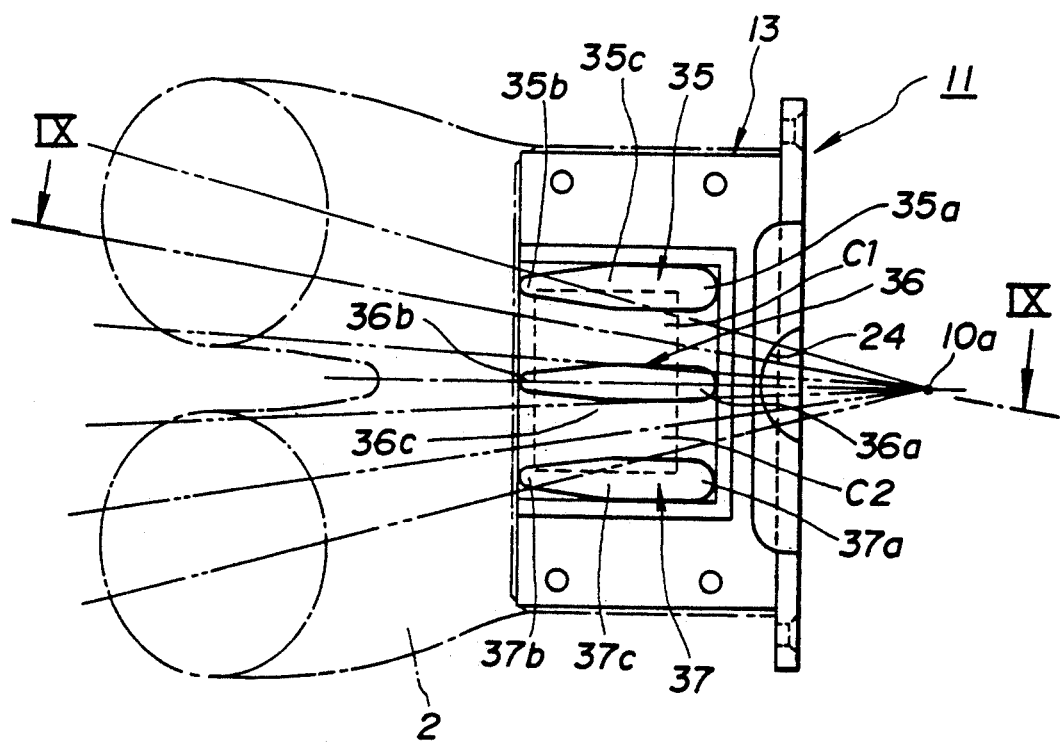
FIG. 8 is a bottom view of a third embodiment of the heater device according to the present invention.
Figure 9:
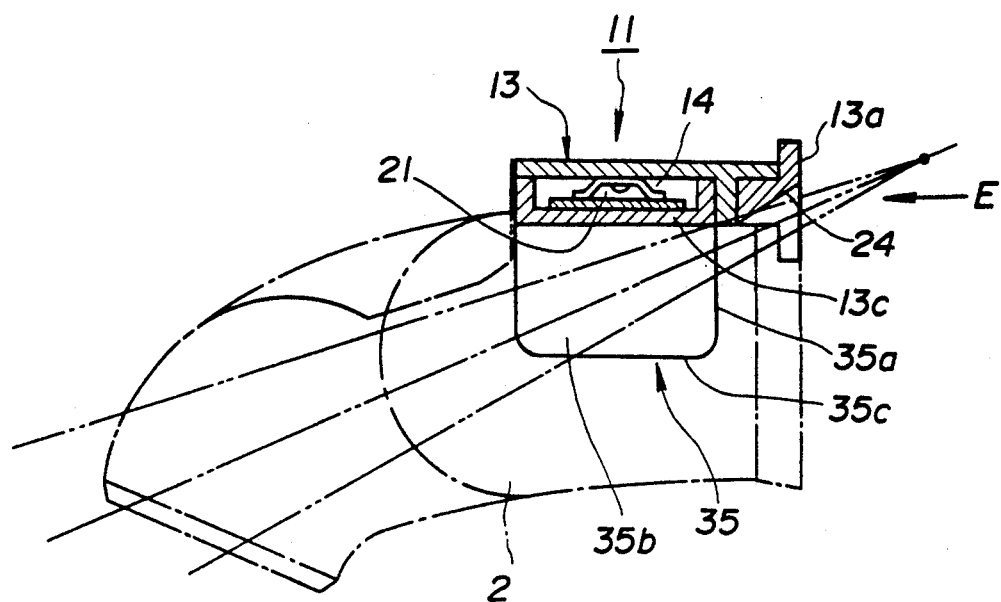
FIG. 9 is a side view taken in the direction of arrows substantially along the line IX—IX of FIG. 8.
Figure 10:
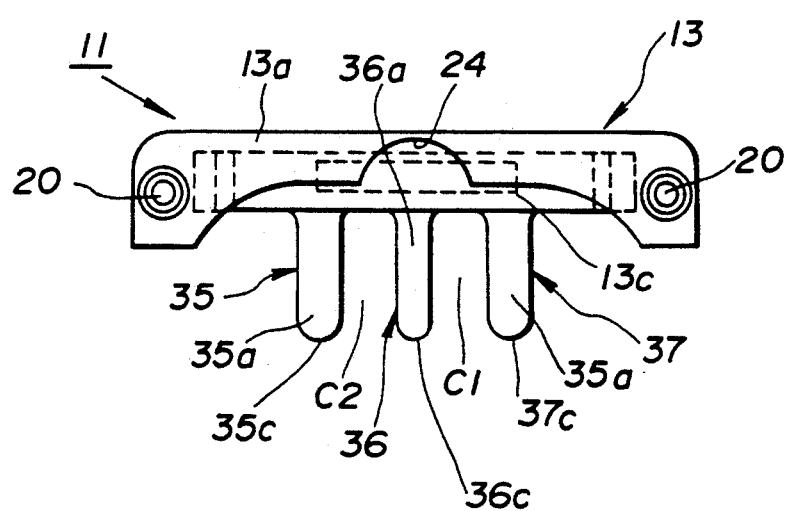
FIG. 10 is a side view taken in the direction of arrow E of FIG. 9.

Referring to FIGS. 8 to 10, there is shown a third embodiment of the heating device 11 for injected fuel in an internal combustion engine in accordance with the present invention.

In this embodiment, the heating device 11 comprises three fins 35, 36 and 37 which are arranged to be along intake air flow. The fins 35, 36 and 37 are connected to the lower plate 13c of the casing 13 so as to be parallel with the axial direction of the intake port 2 as shown in FIG. 8. The fins 35, 36 and 37 are formed generally rectangular to get large surface areas and define spaces C1 and C2 therebetween as shown in FIG. 8. Front ends 35a, 36a and 37a of the respective fins 35, 36 and 37 are formed arcuate, and the fins 35, 36 and 37 are formed to be gradually thinned from middle portions toward rear ends 35b, 36b and 37b. The front ends 35a, 36a and 37a are positioned so as to be opposite to the injection hole 10a through the cut-away 24 of an arcuate shape. Lower surfaces 35c, 36c and 37c of the fins 35, 36 and 37 are formed arcuate as shown in FIG. 10.

With the thus arranged heating device 11, when the injected fuel passes through the spaces C1 and C2, the fuel is heated by the fins 35, 36 and 37 and sufficiently vaporized. Particularly, since the fins 35, 36 and 37 are formed to be larger in size than the area defined by the angle of the injected fuel, the heating of fuel by the fins 35, 36 and 37 are further effectively accelerated.

Furthermore, since the fins 35, 36 and 37 are disposed along the intake air flow, the intake air flow is rectified and guided into the combustion chamber 3. By this rectifying operation, the pressure drop (frictional resistance) is suppressed. Therefore, the intake air charging efficiency to the combustion chamber 3 is improved. Additionally, the fuel attached on the fins 35, 36 and 37 are released by the intake air flow and sufficiently atomized.

While the invention has been shown and described with reference to preferred embodiments thereof, it will be understood that various changes in form and details can be made therein without departing from the spirit and scope of the invention. For example, it is noted that the fins may be variously modified in angle, size and number. Furthermore, it will be appreciated that the heater 14 may be directly imbedded in the fins for further improving the rising speed of the temperature, and that the heating device may be disposed at a downstream end of the intake port 2.

What is claimed is:

1. A heating device disposed in an intake passage of a fuel injected internal combustion engine, said heating device heating fuel which is injected in a radial manner from a fuel injection valve into said intake passage in a direction toward a combustion chamber, said heating device comprising:
   a supporting member fixed to a wall defining said intake passage; and
   a plurality of fins extending from said supporting member into said injected fuel, said fins further being oriented radially with respect to said injection valve.

2. A heating device as set forth in claim 1, wherein said supporting member includes a PTC heater element which is disposed between said supporting member and said wall.

3. A heating device as set forth in claim 2, wherein the heater is provided with current from a battery when an ignition switch of the engine is turned on under a cold condition.

4. A heating device as set forth in claim 1, wherein said supporting member is fixed to an upper portion of said intake passage, and said each fin downwardly extends from said supporting member.

5. A heating device as set forth in claim 1, wherein said fins are spaced from each other so that the injected fuel passes through the spaces defined by said fins.

6. A heating device as set forth in claim 1, wherein the surface area of a central fin of said plurality of fins is larger than that of the other fins.

7. A heating device as set forth in claim 1, wherein a front portion of said supporting member is opposite to said fuel injection valve is formed with a cutaway portion.

8. A heating device as set forth in claim 1, wherein said fins are arranged symmetrically about a central fin which is oriented along a hypothetical line leading from said fuel injector to said combustion chamber.

9. A heating device as set forth in claim 1, wherein a central fin is arranged in parallel to the axial direction of said intake passage.

10. A heating device disposed in an intake passage of an internal combustion engine, said heating device heating fuel injected from a fuel injection valve, said heating device comprising:
- a supporting member fixed to a wall defining the intake passage and having a heater element;
- at least two fins extending from said supporting member and spaced from each other; and
- a guide portion disposed between said fins and having a surface projected from said supporting member, said surface being arcuate so as to smoothly introduce the fuel to a combustion chamber of the engine.

11. A heating device disposed in an intake passage of an internal combustion engine, said heating device heating fuel injected from a fuel injection valve into the intake passage, said heating device comprising:
- a supporting member fixed to a wall defining the intake passage; and
- a plurality of fins extending from said supporting member in a radial manner with respect to the fuel injection valve and including a central fin which is parallel to the axial direction of the intake passage.

12. An internal combustion engine of an injection type comprising:
- a cylinder having an intake passage and an intake valve;
- a fuel injector for injecting fuel into said intake passage; and
- heating means for heating the fuel injected from said fuel injector, said heating means having a support member fixed to a wall defining said intake passage and having a plurality of fins extending from said support member such that the fins are parallel to the direction of the injection of fuel.

* * * * *